(12) United States Patent
Gisslén et al.

(10) Patent No.: US 11,878,249 B2
(45) Date of Patent: Jan. 23, 2024

(54) PLAYTESTING COVERAGE WITH CURIOSITY DRIVEN REINFORCEMENT LEARNING AGENTS

(71) Applicant: Electronic Arts Inc., Redwood City, CA (US)

(72) Inventors: Linus Mathias Gisslén, Stockholm (SE); Joakim Bergdahl, Stockholm (SE); Konrad Tollmar, Stockholm (SE); Camilo Andrés Gordillo Chaves, Stockholm (SE)

(73) Assignee: Electronic Arts Inc., Redwood City, CA (US)

( * ) Notice: Subject to any disclaimer, the term of this patent is extended or adjusted under 35 U.S.C. 154(b) by 118 days.

(21) Appl. No.: 17/656,190

(22) Filed: Mar. 23, 2022

(65) Prior Publication Data
US 2022/0305386 A1    Sep. 29, 2022

Related U.S. Application Data

(60) Provisional application No. 63/164,980, filed on Mar. 23, 2021.

(51) Int. Cl.
*A63F 13/00* (2014.01)
*A63F 13/60* (2014.01)
*A63F 13/52* (2014.01)
*A63F 13/35* (2014.01)

(52) U.S. Cl.
CPC .............. *A63F 13/60* (2014.09); *A63F 13/35* (2014.09); *A63F 13/52* (2014.09); *A63F 2300/535* (2013.01); *A63F 2300/55* (2013.01)

(58) Field of Classification Search
CPC .......... A63F 13/79; A63F 13/67; A63F 13/69; A63F 13/822; A63F 13/45; A63F 13/52; A63F 13/00; A63F 13/55; A63F 2300/807; A63F 2300/5553; A63F 2300/8082
See application file for complete search history.

(56) References Cited

U.S. PATENT DOCUMENTS

| | | | | |
|---|---|---|---|---|
| 2015/0375101 A1* | 12/2015 | George | ................. | A63F 13/497 463/24 |
| 2015/0375102 A1* | 12/2015 | George | .................. | A63F 13/00 463/24 |
| 2015/0375103 A1* | 12/2015 | George | ................. | A63F 13/497 463/24 |

* cited by examiner

*Primary Examiner* — David L Lewis
*Assistant Examiner* — Eric M Thomas
(74) *Attorney, Agent, or Firm* — Knobbe, Martens, Olson & Bear, LLP

(57) ABSTRACT

Systems and methods of curiosity driven reinforcement learning agents promote novel exploration of a virtual interactive environment. The data of the exploration can be stored in a buffer to determine, generate, and display visualizations in the virtual interactive environment. The visualizations can correspond to identify issues in the virtual interactive environment and/or identify relationships between regions of the virtual interactive environment.

20 Claims, 9 Drawing Sheets

PLAYTESTING COVERAGE WITH CURIOSITY DRIVEN REINFORCEMENT LEARNING AGENTS

CROSS REFERENCE TO RELATED APPLICATIONS

This application claims the benefits of U.S. Provisional Patent Application No. 63/164,980, filed on Mar. 23, 2021, which is incorporated herein by reference in its entirety.

BACKGROUND

As video games grow in size and complexity it becomes more challenging to ensure that they are optimally tested and validated. Current techniques that compliment or substitute manual testing and validation with automated learning agents often leave some aspects of video games untested, due to things like navigation meshes or reinforcement systems that limit agents' abilities to explore and interact with a virtual interactive environment. As such, systems and methods that reinforce novel and/or more diverse actions (e.g., curiosity) of automated learning agents in an unbounded exploration of a virtual interactive environment would be advantageous in maximizing the coverage aspects tested and validated in video games.

SUMMARY

The present disclosure is directed to a method and system including one or more processors; and one or more memory devices, each of the one or more memory devices communicatively coupled to at least one of the one or more processors, the one or more memory devices storing computer-executable instructions defining at least a curiosity agent service and a video game; wherein a runtime execution of the computer-executable instructions causes the one or more processors, to: deploy, from the curiosity agent service, a curiosity agent to associate to a player character in a first instance of a first virtual interactive environment of the video game; associate the curiosity agent to the player character; cause, by the curiosity agent service, the curiosity agent to direct the player character to navigate the first virtual interactive environment from a first spawn point, over a plurality of explorations, by iteratively, up to a navigation threshold: (i) receiving, from the curiosity agent, perception data corresponding the player character, and (ii) providing, to the curiosity agent, one or more navigation commands to cause the curiosity agent direct the player character, wherein the one or more navigation commands are based at least in part on the perception data and a visitation state buffer; store, within the visitation state buffer, a new data entry corresponding to a new location visited by the player character, wherein the visitation state buffer is configured to require the new data entry to be at a location beyond a distance threshold of any existing data entry of the visitation state buffer; update, within the visitation state buffer, counters associated with each data entry when the curiosity agent directs a player character visits a location within the distance threshold of a respective data entry; provide, by the curiosity agent service, a reward based in part on the visitation state buffer; and determine, by the curiosity agent service, if a spawn threshold is met, wherein meeting the spawn threshold causes the curiosity agent service to: (i) determine a location for a subsequent spawn point in the first instance of the first virtual interactive environment, and (ii) set the subsequent spawn point in the determined location for a subsequent exploration among the plurality of explorations.

BRIEF DESCRIPTION OF THE DRAWINGS

This disclosure will be more fully understood from the following detailed description taken in conjunction with the accompanying drawings, in which.

DETAILED DESCRIPTION

Figure 1A:
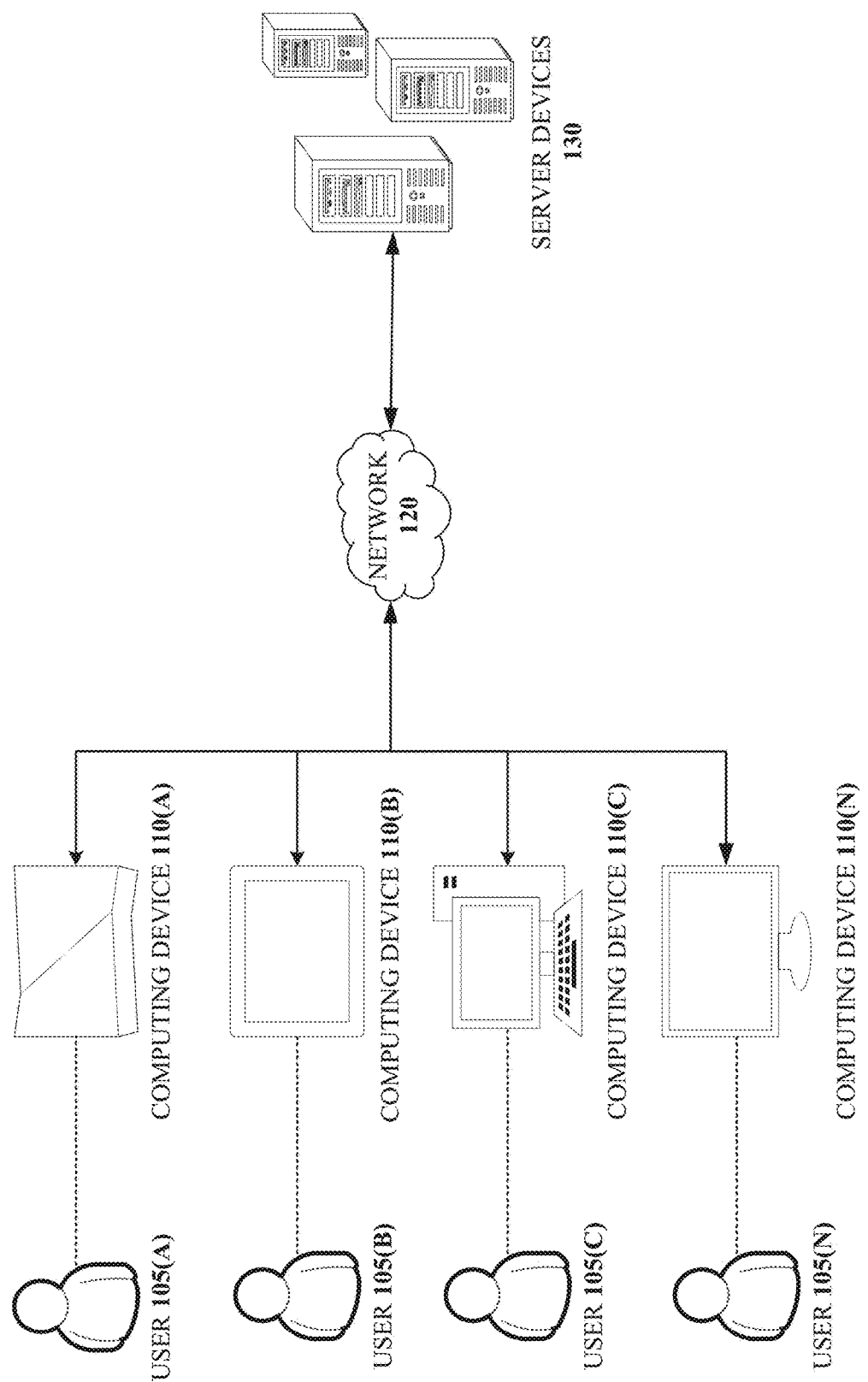
FIG. 1A illustrates an example embodiment of a computing device environment for utilizing curiosity agents in a virtual interactive environment of a video game.

The systems and methods described herein relate to curiosity agents configured to maximize exploration coverage in a virtual interactive environment. The curiosity agents are based in part on a reinforcement learning model that rewards novel exploration of a virtual interactive environment. Data corresponding to the novel explorations of curiosity agents are stored in a buffer. The location of spawn points for the curiosity agents are also based in part on the data stored in the buffer. The configuration of the model, rewards, and spawn point locations ensure that the curiosity agents seek out unexplored areas of a virtual interactive environment in each exploration.

A curiosity agent service can deploy curiosity agents into the virtual interactive environment of a video game. The curiosity agents can be communicatively coupled with curiosity agent service. A curiosity agent can be configured to send perception data to the curiosity agent service. The curiosity agent service can be configured to provide a navigation command or gameplay command to the curiosity agent based in part on the perception data received from the curiosity agent. The navigation command is used in part to control and/or direct a player character associated with the curiosity agent in a virtual interactive environment.

The curiosity agent can be configured to explore a virtual interactive environment from a spawn point. The curiosity agent may explore the virtual interactive environment from the spawn point up to an exploration threshold. Once the exploration threshold is reached, the curiosity agent may be respawned at the spawn point to begin a new exploration.

A subsequent spawn point for the curiosity agent may be set by the curiosity agent service once a spawn threshold has been met. The location of the subsequent spawn point can be based in part on the exploration of the curiosity agent, and be set to a location (e.g., world space position) within the virtual interactive environment that enables the curiosity agent to explore an unexplored (or less-than-optimally explored) area and/or region of a virtual interactive environment that was not previously explorable or accessible to the curiosity agent from the previous spawn point location.

Data corresponding to the exploration of curiosity agents can be stored in one or more buffers. A visitation state buffer is configured to store data corresponding to a novel world space position explored in the virtual interactive environment by the curiosity agent. An episodic trajectory buffer is configured to store data corresponding to novel traversals or routes taken by a curiosity agent in a virtual interactive environment. A termination counter (or termination buffer) is configured to store data corresponding to areas and instances in which the curiosity agent was permanently stuck and/or unable to complete an exploration in the virtual interactive environment.

Visualizations based in part on one or more of the aforementioned buffers or data corresponding to exploration of curiosity agents can be produced in the virtual interactive environment. The visualizations can indicate or identify any number or type of observations deemed useful or relevant for validating or testing purposes, including for example issues in the virtual interactive environment and/or relations between regions of the virtual interactive environment. The visualizations, buffers, or data can be used in part to validate one or more aspects of a video game.

System Overview

FIG. 1A illustrates an example embodiment of system 100 for deploying and utilizing curiosity agents in a virtual interactive environment of a video game.

As shown, the system 100 is an environment including users 105(A), 105(B), 105(C), and 105(D) (collectively referred to herein as "105" or "users 105") of respective computing devices 110(A), 110(B), 110(C), and 110(D) (collectively referred to herein as "110 or "computing devices 110"). The computing devices are communicatively coupled to game server devices 130 over a network 120, for, among other things, playing a video game. It should be understood that the system 100 can include any number of users, computing devices, network and/or server devices beyond those shown in FIG. 1.

Users 105 can be players or automated learning agents playing a video game on computing devices 110. In some embodiments, there is a one-to-one correspondence between the users 105 and the computing devices 110. In some embodiments, there is an N to one or one to N (wherein "N" is an arbitrary real value) correspondence between the users 105 and the computing devices 110. It should be understood that as described in the present disclosure, a "user" on or of a computing device playing a video game can refer to or be synonymous with a "player" or "agent" of the video game.

Computing devices 110 are hardware devices capable of or configured for, among other things, playing or executing a video game. As illustrated in the example embodiment of FIG. 1, computing device 110(A) is a video game console; computing device 110(B) is a mobile device; computing device 110(C) is a personal computer; and computing device 110(D) is a display device, though it should be understood that the computing devices 110 can be any type of computing device known to those of skill in the art. In some embodiments, computing devices 110 have hardware components that can run a video game locally. In some embodiments, two or more of the computing devices 110 are similar to one another—e.g., of the same type. In some embodiments, the computing devices 110 can run or execute video games through a cloud gaming service, as known to those of skill in the art.

In some embodiments, computing devices 110 connect to a gameplay session of a video game by way of being communicatively coupled to game server device 130 over a network 120. Network 120 communicatively couples computing devices 110 and game server devices 130. In some embodiments, a network 105 can be any method of connectivity or communication between devices known in the arts, such as, but not limited to, a direct wired connection, Near Field Communication (NFC), Local Area Network (LAN), an internet connection, or other communication methods of the like.

Server device 130 can be one or more computing devices including one or more processors, graphic processors, memory, storage, and networking capabilities. The one or more computing devices of server device 130 can be communicatively coupled to the one or more computing devices 110 over the network 120.

Server device 130 can provide one or more centralized services to a video game. In some embodiments, server devices 130 provide services for video games such as, but not limited to: curiosity agent services, matchmaking, skill measurement, authentication, player account services, fraud detection, gameplay data management, datastores, and other video game services of the like.

Additionally, the one or more hardware devices of server devices 130 can be configured to execute software applications, such as video games, and provide streaming and/or cloud-based access and control to one or more computing devices 110.

Software Environment

Figure 1B:
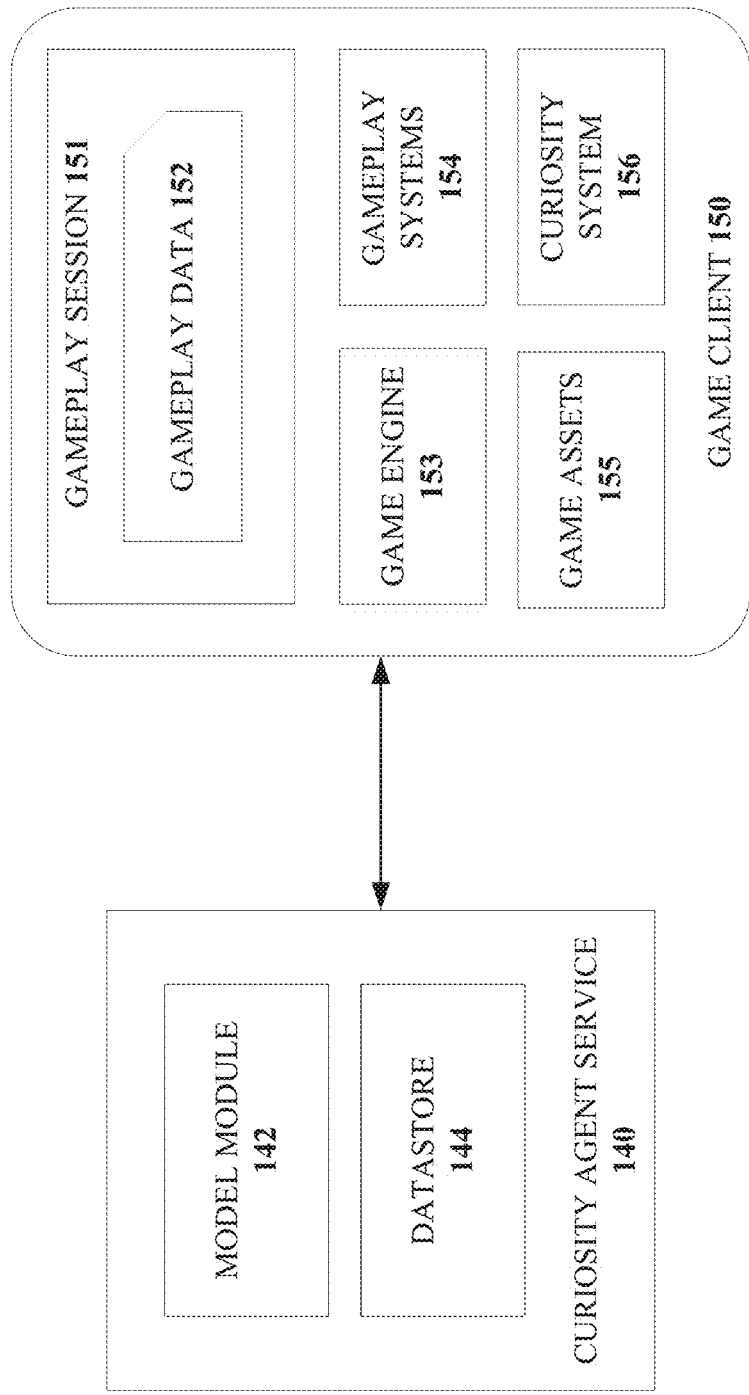
FIG. 1B illustrates an example embodiment of a software environment for utilizing curiosity agents in a virtual interactive environment of a video game.

FIG. 1B illustrates an example of a software environment 100(B) for deploying and utilizing curiosity agents in a virtual interactive environment of a video game. The software environment 100(B) includes curiosity agent service 140 and game client 150. In some embodiments, the computer-executable instructions of curiosity agent service 140, among other things, are stored and executed in a memory computing device, respectively, of the server device 130. In some embodiments, the computer-executable instructions of game client 150, among other things, are stored and executed in a memory and computing device, respectively, of the computing device 110. In some embodiments, curiosity agent service 140 and game client 150 are communicatively coupled over network, such as network 120.

Curiosity Agent Service

The curiosity agent service 140 can include model module 142 and datastore 144, among other things. Module 142 can maintain, update, and utilize a number of machine learning models, such as neural networks. Datastore 144 can store models, data, and computer-executable instructions corresponding to model module 142, among other things.

In some embodiments, the machine learning models of model module 142 are curiosity models configured and/or trained with curiosity as the driving or reward factor for agents to operate from. It should be understood that, as used herein, curiosity refers to the characteristic of being inquisitive or curious, and/or performing novel, diverse, unique and/or exploratory actions with the intent of exploring or discovering something new or something not previously optimally explored. As such, the agents based in part on, or operating from, the curiosity models of model module 142 are known as curiosity agents.

In some embodiments, the one or more curiosity models of model module 142 are based in part on a reinforcement learning (RL) algorithm utilizing proximal policy optimization (PPO), as known to one skilled in the art. The architecture and/or hyperparameters of curiosity models can be configured in a number of ways; one skilled in the art would appreciate how configurations of machine learning models correlate to one or more test and/or use cases for the models. As such, the curiosity models of model module 142 can be configured and/or based in part on one or more aspects of the game client 150, among other things.

In utilizing a reinforcement learning (RL) algorithm, the curiosity models of model module 142 can, in some embodiments, self-train. For instance, an update to a curiosity model of the model module 142 can be automatically performed based in part on the deployment or training of one or more curiosity agents.

To maximize and optimize the exploration of curiosity agents, curiosity is configured as the basis or reward that reinforces a curiosity model. As such, accomplishing, discovering and/or exploring one or more novel actions or aspects of a video game (e.g., actions or aspects that were not (at all or optimally) previously performed, accomplished, discovered or explored) serve as the motivation factor encouraging (e.g., rewarding) curiosity agents. Therefore, the reward given to the curiosity agents operates as a function of novelty.

In turn, the curiosity agents provide the model module 142 with data that sufficiently corresponds to exploration and/or any characteristics associated therein. The data provided, collected, generated, and/or aggregated by one or more curiosity agents deployed by curiosity agent service 140 can be stored within datastore 144.

In contrast to existing methods and solutions that collect and provide data that validates a behavior policy (such as scripted gameplay events and/or objectives, character controls, and other gameplay behaviors of the like), the data from a curiosity agent can provide, through analysis and/or visualizations, such as PPO, an indication, identification, and/or validation of one or more known or unknown issues of the video game and/or how changes to one or more aspects of the video game impact the exploration of a curiosity agent; and in turn impact the player experience.

For instance, the data from a curiosity agent can indicate or identify how a player may interact with, traverse, or navigate through a virtual interactive environment of a video game. The data can also indicate and/or identify an interactive relationship (e.g., in gameplay) between the areas, regions or objects of a virtual interactive environment. Additionally, the data can also indicate, identify, and/or validate any known or unknown exploits within the virtual interactive environment, or other aspects of the video game.

As video games often change over the course of development and over the course of live services (e.g., after initial release), the curiosity models of model module 142 can be updated, reconfigured, or retrained as needed, such that the curiosity models can account for changes made to a video game.

For example, data corresponding to an exploration of a curiosity agent can differ before and after a change to one or more aspects of the video game, including changes in character controls, objectives, and the virtual interactive environment. The data of the curiosity agent—e.g., the curiosity agent's exploration results—can indicate, identify, and/or validate how the change might affect the gameplay experience of a player. For instance, as a result of a change in the virtual interactive environment itself and/or a change in the character controls, a curiosity agent may be able to reach an area of a virtual interactive environment that was previously inaccessible to the curiosity agent (e.g., within the parameters and/or constraints of the corresponding character controls). Therefore, the data provided by the curiosity agent reaching this area as result of the change can be used in part to update the curiosity model.

Additionally, the data provided by the curiosity agent reaching this area as result of the change can serve as indication, identification, or validation of the change itself, and can also be an indication, identification, or validation of how the change impacts the player experience, among other things.

As appreciated by one skilled in the art, a number of curiosity models, or variations thereof, can be created, configured, and trained among model module 142. Each variation can be optimal or suitable for a particular video game in whole or part, and/or for a particular build or version of (e.g., change to) a video game, in whole and/or in part. In some embodiments, a game client 150 communicatively coupled to curiosity agent service 140 can provide an indication, command, and/or request as to which curiosity model among those of the model module 142 to utilize in the deployment and/or exploration of a curiosity agent.

Game Client

Game client 150 is software of or forming a video game, or portion thereof. Game client 150 can have a corresponding gameplay session 151 and game client components (153, 154, 155, and 156).

Gameplay session 151 is an instance of game client 150 and can have a corresponding virtual interactive environment. Gameplay session 151 can include one or more virtual levels, spaces, objects and/or graphical user interface elements, among other aspects, of game client 150 that provide a playable or interactive virtual space (e.g., a virtual interactive environment) for a curiosity agent and/or user to test, explore, navigate, and/or validate. For example, gameplay session 151 can be a level of a video game including quests, objectives, enemies, and other gameplay features, elements, or aspects known in the art.

Gameplay session 151 provides an instance of a virtual interactive environment (e.g., game level) among other things, where a curiosity agent service 140 can deploy one or more curiosity agents. In some embodiments, an instance of gameplay session 151 can include and/or support a number of curiosity agents and/or users. In some embodiments, gameplay session 151 can vary or differ between instances.

In one example, a first instance of a gameplay session may be of a first version of a first virtual interactive environment, while a subsequent instance of a gameplay session may be of a subsequent version of the first virtual interactive environment, such that there are one or more changes or differences among the first virtual interactive environment between the two instances of the gameplay session.

Gameplay session 151 may include a number of player characters. Player characters of the gameplay session 151 can refer to controllable character models configured to facilitate or perform gameplay actions or commands. In some embodiments, a curiosity agent and/or user can control and/or direct one or more player characters in a virtual interactive environment of gameplay session 151.

The gameplay session 151 may include a number of player objects. Player objects of gameplay session 151 can refer to controllable objects, or models, used to facilitate or enable gameplay or other in-game actions. Player objects may be, for example, vehicles, vessels, aircraft, ships, tiles, cards, dice, pawns, and other in-game items of the like known to those of skill in the art. In some embodiments, a curiosity agent and/or user can control or direct one or more player objects in gameplay session 151, including, in some instances, by controlling player characters which in turn causes the objects to be controlled.

For simplicity, player characters and player objects are collectively referred to herein as player characters in some embodiments. It should be understood that, as used herein, "controllable" refers to the characteristic of being able and/or configured to be controlled and/or directed (e.g., moved, modified, etc.) by a curiosity agent, and/or through other input means, such as a controller or other input device by a player or user.

Gameplay data 152 can refer to data corresponding to gameplay session 151. Gameplay data 152 can be produced or generated over the course of gameplay session 151. In some embodiments, gameplay data 152 can include the data produced or generated over the course of a number of gameplay sessions of game client 150.

Gameplay data 152 may be versioned and/or stored periodically as a number of files within a memory device associated with game client 150 or remotely on a server or service, such as datastore 144. Additionally, gameplay data 152, or copies and/or portions thereof, can be stored, referenced, categorized, or bucketed into in a number of buffers. A buffer can be configured to capture particular data, or data types, of gameplay data 152. The buffers can be configured within both curiosity agent service 140 and game client 150.

The gameplay actions of curiosity agents—and in turn of player characters—can produce gameplay data 152 and/or be captured among gameplay data 152 over the course of gameplay session 151. Events, objectives, triggers, and other gameplay aspects or elements of the like can also produce gameplay data 152 and/or be captured among gameplay data 152 over the course of gameplay session 151.

Game client components (e.g., game engine 153, gameplay systems 154, game assets 155, and curiosity system 156) are portions or subparts of, corresponding to and/or associated with game client 150 that provide the underlying frameworks and software that support and facilitate features of the video game, such as virtual interactive environments and curiosity agents.

In some embodiments, a game engine 153 is an underlying software framework that runs a video game. Game engine 153 includes, among other things, a renderer, simulator, and stream layer. A renderer is a graphics framework that manages the production of graphics. As used herein in some embodiments, a simulator refers to a framework that manages simulation aspects corresponding to physics and other corresponding mechanics used in part for animations and/or interactions of gameplay objects, entities, characters, lighting, gasses, and other game assets or effects of the like. A stream layer is a software layer that allows a renderer and simulator to run independently of each other by providing a common execution stream for graphics and animations to be produced at runtime. In some embodiments a game engine includes an audio engine that synchronizes audio playback with the common execution of a stream layer, or with the simulator directly.

Gameplay systems 154 can be used in conjunction with a game engine 153 to facilitate and manage gameplay logic and other features of a game client 150. Gameplay systems 154 are software components that can support the game engine 153, among other things. For example, gameplay systems 154 can include software development kits (SDKs), application program interfaces (APIs), and software libraries such as shims and/or dynamically linked libraries (DLLs) that enable a variety of functionality such as providing additional graphics, audio, or communication support, establishing and maintaining service connections, performing authorizations, and providing anti-cheat and anti-fraud detection, among other things.

In some embodiments, a game engine 153 and/or gameplay systems 154 reference game assets 155 to produce a gameplay session 151. Game assets 155 are digital assets that correspond to or can be used to create the virtual interactive environments of a game client 150, such as menus and gameplay sessions. In some embodiments, the game assets 155 can include game objects, textures, terrain maps, geometry scripts, animation files, audio files, character models, video files, font libraries, visual effects, and other digital assets of video games of the like.

Curiosity System 156 is a system that can be incorporated into and utilized by game client 150 to support, deploy, and update, among other things, curiosity agents and/or a curiosity model in whole or in part. In some embodiments, curiosity system 156 is a library, SDK, or other software component or module that provides game client 150 functionality and support for the deployment of curiosity agents from curiosity agent service 120.

In some embodiments, curiosity system 156 is a local version of curiosity agent service 140 that enables game client 150 to deploy curiosity agents without being communicatively coupled to curiosity agent service 140, and perform the aforementioned and forthcoming functionalities of a curiosity service and/or of curiosity agents described herein, in whole or in part, among other things.

Curiosity Agent Service

Figure 2:
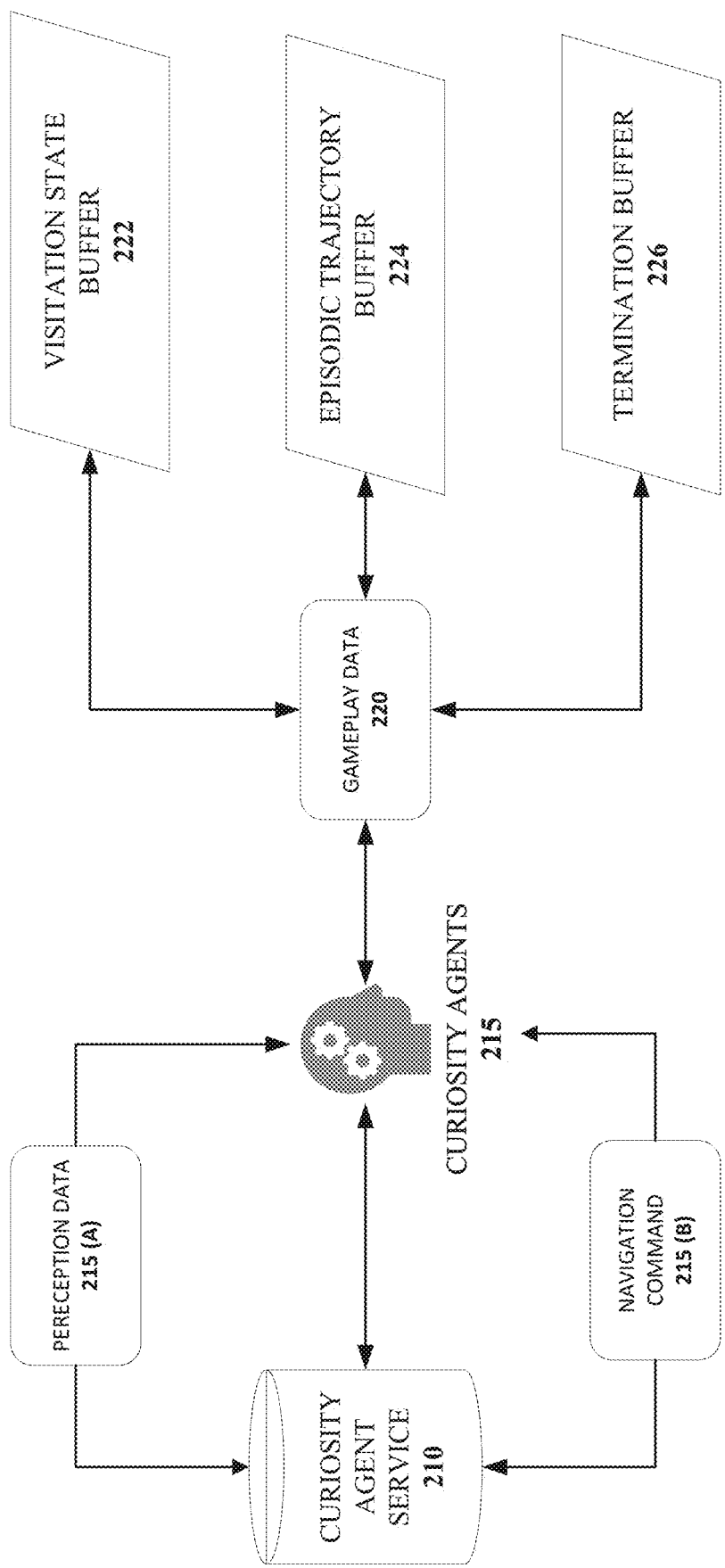
FIG. 2 illustrates an example embodiment of a system for curiosity agent service to deploy curiosity agents in a virtual interactive environment to produce gameplay data.

FIG. 2 illustrates an example embodiment of a system 200 for curiosity agent service 210 to deploy curiosity agents 215 in a virtual interactive environment of a video game.

In some embodiments, curiosity agent service 210 is similar to curiosity agent service 140 of FIG. 1B. As such, the curiosity agents 215 deployed by curiosity agent service 210 are also based in part on a curiosity model of a model module, such as the curiosity models of model module 142 of FIG. 1B. System 200 illustrates the deployment of one or more curiosity agents 215 in one or more virtual interactive environments of one or more video games, such as game client 150 of FIG. 1B. For simplicity, curiosity agent(s) 215 are referred to in both singular and plural forms and are similar to the curiosity agents described in FIG. 1B.

Curiosity agents 215 can be communicatively coupled to curiosity agent service 210 such that data and commands, among other things, can be communicated among curiosity agent service 210 and curiosity agents 215 and/or a number of respective game clients. As such, a deployed curiosity agent 215 can send and receive data and commands from curiosity agent service 210.

Gameplay data 220 includes data or information about or corresponding to: (i) player characters, (ii) virtual objects, (iii) gameplay objectives, (iv) regions and areas of the virtual interactive environment, (v) gameplay events and triggers, (vi) and other telemetry and states of gameplay known to those of skill in the art. In some embodiments, gameplay data 220 includes data corresponding to the positions, paths, routes, regions, areas, and actions that a curiosity agent 215 traversed, explored to, and/or performed in a virtual interactive environment.

Gameplay data 220 can be produced, generated, and stored during a gameplay session of a video game, such as during the deployment of curiosity agents 215 in a virtual interactive environment. Gameplay data 220 can be stored, referenced, and/or duplicated into a number of buffers or memory devices.

Gameplay data 220 can be communicated between a game client, curiosity agent service 210, and curiosity agents 215. Gameplay data 220 can be used in part by curiosity agent service 210 to direct or control curiosity agents 215 deployed in a virtual interactive environment. An update to a curiosity model of curiosity agent service 210 can also be based in part on gameplay data 220.

Curiosity Agents

Curiosity agent(s) 215 are deployable components and/or products of or corresponding to curiosity agent service 210 which are based in part on one or more curiosity models of curiosity agent service 210. In some embodiments, a curiosity agent 215 is or refers to the logic configured to autonomously direct and/or control a player character in a virtual interactive environment of a video game. For example, a curiosity agent 215 may be a script or other defined and/or generated logic produced by curiosity agent service 210. The direction and/or control of player character in a virtual interactive environment (e.g., gameplay session) can produce gameplay data 220.

The association of the curiosity agent 215 to, or with, one or more player characters can be supported by one or more game client components of a game client, such as curiosity system 156 of FIG. 1. For example, a game client can be configured to make and/or accept calls and requests from curiosity agent service 210 s. In turn, a game client, or gameplay session thereof, can include a number of player characters to be associated with a number of curiosity agents 215.

In some embodiments, a game client can be configured such that the instantiation of a number of player characters in a gameplay session enables the game client to request a number of curiosity agents 215 from curiosity agent service 210. In some embodiments, a game client can be configured such that curiosity agent service 210 can make requests to the game client to instantiate, or otherwise provide, a player character to associate a curiosity agent 215 with.

The association of a curiosity agent 215 enables the curiosity agent 215 to be deployed within a gameplay session, or virtual interactive environment thereof, and may occur as a single step or separate steps of a process. For simplicity, as described herein, an association of a curiosity agent with a player character is synonymous and/or interchangeable with the deployment of a curiosity agent. Additionally, the terms "player character" and "curiosity agent" are also herein, in some embodiments, synonymous and/or interchangeable with one another.

In some embodiments, curiosity agent(s) 215 are configured to autonomously direct and/or control a player character within the virtual interactive environment of a video game in conjunction with curiosity agent service 210. For example, the curiosity agent service 210 can direct and/or control a player character in an instance of a virtual interactive environment of a video game through curiosity agent 215, similar to how a player of a video game controls a player character in an instance of a virtual interactive environment of a video game through input (e.g., from an input device, such as a controller).

In some embodiments, curiosity agent(s) 215 are configured to autonomously direct and/or control a player character within the virtual interactive environment of a video game independently. For example, the curiosity agent 215—deployed into a gameplay session of a game client—can direct and/or control a player character in an instance of a virtual interactive environment of a video game independently (e.g., in itself), similar to how a player of a video game controls a player character in an instance of a virtual interactive environment of a video game through input (e.g., from an input device, such as a controller).

In some embodiments, a curiosity agent(s) 215 can autonomously direct and/or control a player character within the virtual interactive environment of a video game (e.g., gameplay session) wholly independently. In some embodiments, the curiosity agent(s) 215, in conjunction with the curiosity agent service 210, can direct and/or control a player character—e.g., as a hybrid implementation between the two autonomous systems (210 and 215) that can dynamically allocate, assign, or otherwise divide how and when each system may control one or more player characters.

In some embodiments, a deployment of a curiosity agent 215 includes a number of explorations, or sets of explorations. Explorations can enable a curiosity agent—or curiosity agent service—to explore a virtual interactive environment up to an exploration threshold that defines one or more conditions, criteria, or other instructions, that indicate the completion of an exploration. For example, exploration threshold can be conditioned on a number of steps. actions, gameplay objectives, eliminations, interactions, triggers, achievements, goals, and/or distance, among other things.

Over the course of deployment and explorations, curiosity agents 215 can provide perception data 215(A) to curiosity agent service 210. In some embodiments, perception data 215(A) includes data corresponding to aspects and/or elements of the virtual interactive environment that are perceivable to a curiosity agent. The perception of a curiosity agent 215 may be configured in a number of ways and can include aspects or elements of the virtual interactive environment that are visibly imperceivable (i.e., not rendered or occluded in the displayed virtual interactive environment).

For instance, the curiosity agent 215 may be configured to collect or gather perception data 215(A) through a number of ray casts. The ray casts can be configured to be cast in a variety of directions around the player character, such that the player character serves as an origin point, rather than a particular world space position (e.g., three-dimensional coordinates) within the virtual interactive environment. The ray casts can be configured to provide data corresponding to an object (e.g., virtual game object) the ray cast collides with or detects, and the distance in which the ray cast traveled to reach the object, among other things, such as directionality and the world space positions. The ray casts can, in some embodiments, be configured to collide or detect some objects and not others. The ray casts can, in some embodiments, be configured to be rendered to display (e.g., among the virtual interactive environment).

The curiosity agent 215 may be also configured to collect or gather perception data 215(A) as a number of images, or image captures. The images can be of varying perspectives corresponding to the player character of the curiosity agent 215, such as first person view, a third person view, an overhead view, and other perspectives of the like.

In some embodiments, the perception data 215(A) collected or gathered by a curiosity agent is a combination of a number of ray casts and a number of images. In some embodiments, the perception data 215(A) can include data corresponding to a world space position, velocity, rotation, and other information corresponding to an object and/or curiosity agent 215.

In some embodiments, perception data 215(A) is periodically provided to the curiosity agent service 210, such as, before or after each step or gameplay action of a curiosity agent 215. A curiosity agent service 210 can be configured to request perception data 215(A) from a curiosity agent 215 periodically. Perception data 215(A) can be stored to a memory device, such as a data store corresponding to a game client or curiosity agent service 210.

The curiosity agent service 210 and/or curiosity agent 215 can utilize perception data 215(A) to develop an understanding of one or more aspects of the virtual interactive environment captured with the perception data 215(A). The understanding of one or more aspects of the virtual interactive environment captured with the perception data 215(A) can be used in part by a curiosity agent 215 or curiosity agent service 210 to produce a command to direct and/or control a player character.

Curiosity agent service 210 can produce a navigation command 215(B). Navigation command 215(B) is a navigation action (e.g., a gameplay action) for the curiosity agent 215 to perform (e.g., apply as input to an associated player character). A navigation command 215(B) can include one or more navigation actions, such as moving forward or backward, strafing left or right, turning left or right, jumping, crouching, vaulting, laying prone, climbing object interaction, or performing other gameplay actions of the like, such as an attack.

In some embodiments, curiosity agent service 210 can produce a navigation command 215(B) for each perception data 215(A) received from curiosity agent 215. A navigation command 215(B) can be based on previously received perception data 215(A) from one or more curiosity agents 215 deployed among one or more instances of a virtual interactive environment. For example, two curiosity agents in separate instances of a virtual interactive environment can each receive a navigation command from a curiosity service based in part on perception data provided by either curiosity agent.

As a result of performing one or more navigation commands, a curiosity agent 215 can arrive in a new or different place in a virtual interactive environment (e.g., advance to or reach another world space position). The new world space position of a curiosity agent 215 can be stored into a buffer for capturing data.

One skilled in the art would appreciate that a navigation command can include any action among an action set for a player character, thereby enabling a curiosity agent to control a player character in a manner equivalent, or similar, to how a user would control the player character. This in turn, enables a curiosity agent to explore a virtual interactive environment with the same abilities and/or capabilities that a user would, allowing the deployment of a curiosity agent to better reflect the potential "player experience" of a user of a video game.

Buffers

A game client or curiosity agent service 210 can include a number of buffers for capturing or referencing data, such as gameplay data 220 or portions thereof. In some embodiments, a visitation state buffer 222, episodic trajectory buffer 224, and termination buffer 226 can be utilized to track a variety of data corresponding to gameplay data 220 and curiosity agents 215.

In some embodiments, visitation state buffer 222 is a buffer for capturing or referencing data corresponding to world space positions (e.g., points visited by the curiosity agent in a virtual interactive environment) of or corresponding to the curiosity agents 215. The visitation state buffer 222 can also store a counter that counts the number of times and/or instances a curiosity agent 215 visits a world space position. As such, each world space position entry in a visitation state buffer 222 can have an associated counter. Visitation state buffer 222 provides a history of the world space positions explored, or navigated to, by one or more curiosity agents 215.

In some embodiments, data corresponding to world space positions visited by a curiosity agent 215 are configured to be captured within visitation state buffer 222 based in part on one or more conditions. A world space position can be captured or referenced in visitation state buffer 222 as a new entry when the world space position visited by a curiosity agent 215 is of a distance greater than a distance threshold from another world space position currently captured or referenced in the visitation state buffer 222. A counter associated with, or to, a world space position can be updated, incremented, or otherwise changed, when a curiosity agent 215 visits a world space position that is of a distance less than a distance threshold from the (first or prior) world space position.

In some embodiments, a distance threshold is multi-dimensional distance with respect, or corresponding to, a virtual interactive environment of gameplay session of a video game. For example, a distance threshold of five cubed meters (53 m) can be configured such that (i) a new entry of a world space position can be captured in visitation state buffer 222 when a curiosity agent 215 navigates to a world space position that is beyond the distance threshold in any three dimensional direction (e.g., x, y, and z planes) in the virtual interactive environment, and (ii) a counter associated with a world space position is incremented when a curiosity agent 215 navigates within five cubed meters of any world space position currently captured within visitation state buffer 222.

In some embodiments, a counter associated with a world space position is updated, incremented, or otherwise changed when a curiosity agent 215 navigates into an area (e.g., world space position) that is within a distance threshold of a world space position currently stored within the visitation state buffer, as opposed to when a curiosity agent 215 is navigating within the area encompassed by a distance threshold of a world space position currently stored within the visitation state buffer.

For example, if a curiosity agent 215 navigates one meter from its previous world space position as a result of, or in response to, a navigation command, the counter associated with the previous world space position in the visitation state buffer 222 can be configured not to increment when the respective distance threshold is configured to a distance greater than one cubic meter: since the curiosity agent is simply navigating within a current distance threshold.

One skilled in the art would appreciate the number of ways to configure the capturing of data to visitation state buffer 222, as well as appreciate the benefits configurations can provide with respect to minimizing the amount of data stored while maintaining or encompassing adequate coverage (of data corresponding world space positions visited by curiosity agent 215) to appropriately test and validate aspects of a video game.

The visitation state buffer 222 can be used in whole or in part to create visualizations illustrating how and where a curiosity agent 215 navigated, explored, or interacted with a virtual interactive environment. The visitation state buffer 222 and/or visualizations created therefrom can serve as an insight as to how a user or player may navigate, explore, or interact with the virtual interactive environment.

In some embodiments, an episodic trajectory buffer 224 can capture or reference data corresponding to the trajectories (e.g., paths or routes, or subsets therein) taken by one or more curiosity agents 215 when exploring a virtual interactive environment (e.g., during deployment or an exploration), among other things. As such, the episodic trajectory buffer 224 provides an insight or understanding of how, or the manner in which, world space positions visited are by curiosity agents 215.

In some embodiments, data corresponding to trajectories of curiosity agents 215 are configured to be captured within episodic trajectory buffer 224 based in part on one or more conditions. A trajectory of a curiosity agent 215 can be stored within episodic trajectory buffer 224 when a trajectory of curiosity agent 215 reaches a particular area, region, boundary, or other world space position. A trajectory of a curiosity agent 215 can be stored within episodic trajectory buffer 224 when a trajectory of curiosity agent 215 corresponds to a particular pattern, distance, or gameplay objective. A trajectory of a curiosity agent 215 can be stored within episodic trajectory buffer 224 when a trajectory of curiosity agent 215 corresponds to, or involved or was achieved by, one or more gameplay actions or commands.

For example, a trajectory of a curiosity agent 215 can be stored within episodic trajectory buffer 224 when a trajectory of curiosity agent 215 crosses, passes, or exits an exploration boundary, which defines the explorable space of a virtual interactive environment for a curiosity agent 215. As another example, a trajectory of a curiosity agent 215 can be stored within episodic trajectory buffer 224 when a trajectory of curiosity agent 215 crosses, passes, or enters a region of interest, which defines a space of interest that a curiosity agent 215 can be configured to be predisposed, or inclined, to navigate to. As another example, a trajectory of a curiosity agent 215 can be stored within episodic trajectory buffer 224 when a trajectory of curiosity agent 215 performs (e.g., through an instruction to an associated player character) a particular gameplay action, such as a double jump.

One skilled in the art would appreciate the number of ways to configure the capturing of data to episodic trajectory buffer 224, as well as appreciate the benefits configurations can provide with respect to minimizing the amount of data stored while maintaining or encompassing adequate coverage (e.g., of data corresponding world space positions visited by curiosity agent 215) to appropriately test and validate aspects of a video game.

In some embodiments, the episodic trajectory buffer 224 can be based in part on, or leverage or reference, the data within the visitation state buffer 222, which, in turn, can reduce the amount of data stored to a memory device or datastore. In some embodiments, the visitation state buffer 222 can be based in part on, or leverage or reference, the data within the episodic trajectory buffer 224, which, in turn, can reduce the amount of data stored. In some embodiments, both the episodic trajectory buffer 224 and visitation state buffer 222 capture similar data corresponding to explorations by curiosity agents 215.

The episodic trajectory buffer 224 can be used in whole or in part, and/or in conjunction with visitation state buffer 222, to create visualizations that illustrate how and where a curiosity agent 215 navigated, explored, or interacted with a virtual interactive environment. This can serve as an insight as to how a user or player will or may navigate, explore, or interact with the virtual interactive environment. As such, the data of—or visualizations produced from—the episodic trajectory buffer 224 can be indicative of how a user may play through a particular trajectory in a virtual interactive environment.

In some embodiments, a termination buffer 226 is a buffer for storing or capturing data corresponding to world space positions of, among other things, curiosity agents 215 when those curiosity agents become "stuck" in a virtual interactive environment. A curiosity agent 215 can be "stuck" when it cannot instruct, direct, or control a respective player character away from its current world position or navigate beyond some area or region of the virtual interactive environment. The curiosity agent 215 can also be "stuck" or "terminated" when the curiosity agent 215 encounters a situation in gameplay that causes the player character to be defeated or otherwise eliminated, such as losing all health points associated with the player character.

For example, a curiosity agent 215 may become stuck as a result of a navigation command 215 that causes it to reach the inside of a pit in the virtual interactive environment that was not intended to be accessible by a player character and, therefore, does not include a manner or method for the player character to exit therefrom. This information can be used to create or enable (i) a design in the virtual interactive environment that allows the curiosity agent 215 to navigate out of the pit or (ii) a gameplay action or command for the curiosity agent 215 to provide the player character that is capable of allowing the player character to exit the pit (e.g., wall climb or triple jump). Due to the curiosity agent becoming stuck, the curiosity agent 215 may not be able to complete an exploration. Therefore, the termination buffer 226 can also be associated with a condition for ending an exploration and/or respawning the curiosity agent 215 to begin a new exploration.

Data such as world space positions, gameplay objectives, actions and statuses of a player character associated with curiosity agent 215 and/or non-player characters, and other gameplay data, can be associated, captured, or referenced in termination buffer 226. In some embodiments, gameplay data corresponding to how a curiosity agent 215 is stuck or terminated is captured in termination buffer 226, which in turn can provide an indication of one or more causes or problems. Thereafter, curiosity agent service 210 can leverage termination buffer 226—or the data thereof—to provide navigation commands 215(B) to direct a curiosity agent 215 away from a world space position stored in the termination buffer 226 to avoid getting stuck again.

The termination buffer 226—or the data thereof—can identify and/or provide an insight to problematic areas of the virtual interactive environment in which a design, boundary, aspect, or feature of the virtual interactive environment or player character was overlooked or not working as intended. In turn, the termination buffer 226—the data thereof—can be utilized to validate one or more features of a video game, such as the design of a level or the actions, parameters, and configurations of a player character.

As a whole and/or individually, the buffers (e.g., 222, 224, and 226)—or data thereof—provide an insight or history of one or more explorations in a virtual interactive environment by one or more curiosity agents 215. A curiosity agent service 210 can leverage the buffers (e.g., 222, 224, and 226)—or data thereof—when providing navigation commands 215(B) to a curiosity agent 215. Therefore, the history of one or more explorations by one or more curiosity agents 215 can be used in part to determine, influence, or dictate where a curiosity agent should navigate to or explore next in the virtual interactive environment.

For example, a curiosity agent service 210 can leverage the data in the buffers (e.g., 222, 224, and 226) to provide a navigate command 215(B) to curiosity agent 215 that would cause the player character associated with curiosity agent 215 to navigate to a world space position in the virtual interactive environment that was not previously navigated to (e.g., an area, region, or location in the virtual interactive environment that is new to a curiosity agent 215). Therefore, a curiosity agent service 210 can utilize or leverage the buffers (e.g., 222, 224, and 226) to provide navigation commands 215(B) that instruct, promote, or facilitate novel exploration of curiosity agents 215.

In some embodiments, each curiosity agent 215 deployed by curiosity agent service 210 can have, or be assigned or designated, unique buffers (e.g., 222, 224, and 226). In some embodiments, all or some curiosity agents 215 deployed by curiosity agent service 210 can share buffers. In some embodiments, the buffers (222, 224, and 226) capture data for one or more explorations of one or more curiosity agents 215 among one or more virtual interactive environments (e.g., instances or gameplay sessions).

The data in the buffers can be captured or stored in a number of ways known to one skilled in the art, such as a multi-dimensional vector or dynamic array. The buffers, or data thereof or stored therein, can be stored to a memory device, such as a datastore. In some embodiments, the buffers can also store data, such as one or more identifiers, corresponding to a version or instance of a curiosity agent, curiosity model, curiosity service, gameplay session, virtual interactive environment instance, game client, and/or other identifiable gameplay data corresponding to a video game of the like.

Exploration

Figure 3:
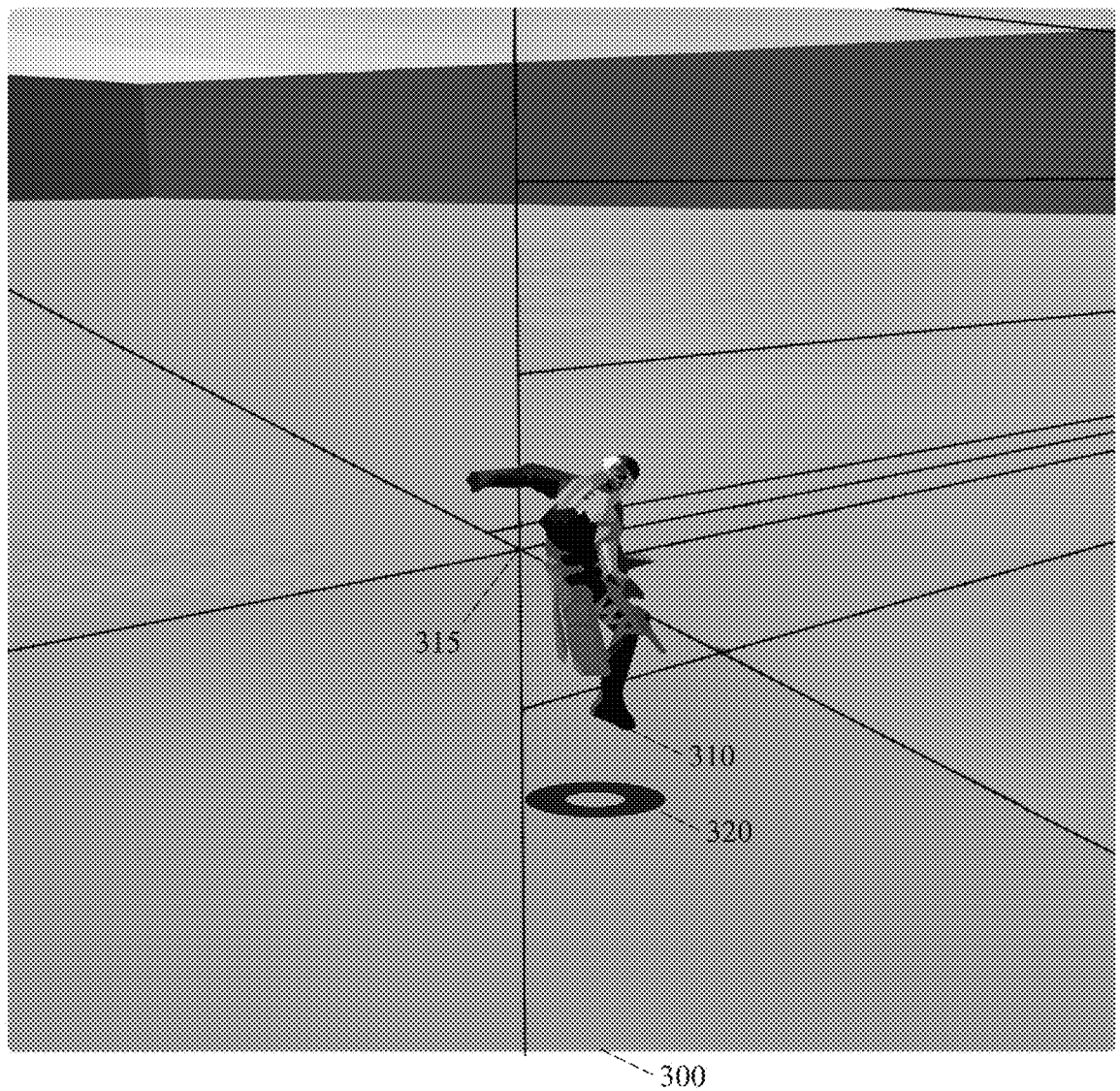
FIG. 3 illustrates an example embodiment of a curiosity agent in a virtual interactive environment of a video game.

FIG. 3 illustrates an example embodiment of a curiosity agent associated to a player character 310 in a virtual interactive environment 300 of a video game, including ray casts 315 and a spawn point 320.

Player Character

In some embodiments, player character 310 includes or refers to a character model configured to receive input or instructions for performing a number of actions for navigating, traversing, and exploring virtual interactive environment 300. In some embodiments, player character 310 can receive a navigation command similar to navigation command 215(B) of FIG. 2. A navigation command provided to player character 310 can cause player character 310 to perform actions such as moving forward or backward, strafing left or right, turning left or right, jumping, crouching, vaulting, laying prone, climbing object interaction, or performing other gameplay actions of the like, such as an attack.

Player character 310 can be associated with a curiosity agent and curiosity agent service similar to curiosity agent 215 and curiosity agent service 210 of FIG. 2. In turn, a curiosity agent or curiosity agent service can instruct, direct, or control player character 310, such as by way of one or more navigation commands. A user of virtual interactive environment 300 can also instruct, direct, or control player character 310, such as by way of one or more navigation commands or control inputs corresponding to one or more actions associated with player character 310. In some embodiments, player character 310 can be instructed, directed, or controlled by both a user and curiosity agent.

In some embodiments, a player character 310 may not include a character model that is rendered (e.g., displayed). For example, a player character 310 may be a virtual camera configured to provide a rendered perspective, such as a first person perspective, for navigating the virtual interactive environment. A user (via a corresponding computing device) or curiosity agent can control the virtual camera by way of one or more navigation commands or control inputs corresponding to one or more actions for movement, manipulation, and/or other functionality associated with a virtual camera.

Overall, player character 310 provides a user or a curiosity agent the ability to navigate, traverse, interact with, and/or explore the interactive environment. In some embodiments, a curiosity agent or curiosity agent service can provide a navigation command to player character 310 that navigates (e.g., directs, controls, or instructs) the character based in part on perception data (similar to perception data 215(A) of FIG. 2).

Ray Casts

Perception data can be provided at one or more states or frames during gameplay. In some embodiments, perception data includes ray casts 315 and images corresponding to one or more camera perspectives associated with player character 310 or the virtual interactive environment, among other types of data.

Ray casts 315 can be associated with player character 310. In some embodiments, ray casts 315 are a set of twelve ray casts projecting outwards from an origin point near and/or associated with player character 310. Each of the twelve ray casts can be configured to be cast in a unique direction along or among the dimensional planes (e.g., x-plane, y-plane, z-plane) corresponding to the virtual interactive environment 300. For example, each of the twelve ray casts (of ray casts 315) can be cast—relative to player character 310—forward, back, left, right, above, below. Some ray casts can be cast near or beside one another, such as along a same dimensional plane.

One skilled in the art would appreciate how a configuration of ray casts 315 corresponds, relates, or is associated to the perception obtained or inferred by the ray cast collisions. For instance, ray casts 315 include three ray casts that are cast or projected in front of player character 310, which, in turn, can provide perception data corresponding to the width of an object, or space between objects, in front of player character 310. For example, if two of the three ray casts in front of player character 310 collide with an object, those two collisions can be included in the perception data provided to a curiosity agent to inform the curiosity agent about the distance to the object and the width—or potential width—of the object, among other things, such that the curiosity agent—or curiosity agent service—can determine how the player character 310 can be navigate around the object or potentially traverse over it.

In some embodiments, information or data about the object detected in a ray cast collision is also included in perception data. For instance, the properties of an object—including world space position, size, and other characteristics—can be provided or included in perception data. For example, if a ray cast collides with a building (or portion thereof) that is a safe house, one or more properties that otherwise define the building as a safe house can be included as part of the perception data. In turn, including properties among perception data can provide a better understanding of the virtual interactive environment (e.g., to a curiosity agent or curiosity agent service).

Furthermore, images corresponding to player character 310 and/or the virtual interactive environment, or portions thereof, can be included or supplement the perception data provided. As such, a combination of ray casts 315 and images can provide a curiosity agent service a better understanding or sense of awareness when causing player character 310 to navigate virtual interactive environment 300.

Spawn Point

Virtual interactive environment 300 can be configured to include spawn point 320. Spawn point 320 can be configured to be at any world space position within the virtual interactive environment. Spawn point 320 is a virtual placement marker that indicates where player character 310 should be placed when "spawning" within the virtual interactive environment.

One skilled in the art would appreciate that player character 310 can be configured to spawn at one or more spawn points when a threshold is met, which can include a number of conditions or criteria. For instance, a threshold can be configured to cause the player character 310 to be spawned at spawn point 320 when at least one condition of the threshold is met. In some embodiments, one or more thresholds can be configured to spawn player character 310 at one or more spawn points.

The deployment and/or association of a curiosity agent with player character 310 can include or lead to a number of explorations among virtual interactive environment 300. Data corresponding to the explorations among virtual interactive environments 300 can be captured in a number of buffers, similar to buffers 222, 224, and 226 illustrated in FIG. 2. Each exploration of player character 310 can include an exploration threshold, similar to the exploration threshold described with reference to FIG. 2.

In some embodiments, an exploration threshold being met signifies the end of one exploration and start of another exploration, in which player character 310 can be respawned at spawn point 320. The exploration threshold can be conditioned or configured to be satisfied or met on a number of things relating to one or more explorations by one or more curiosity agents. For example, an exploration can be configured to include a maximum limit of navigation commands or steps taken by player character 310, among other things.

In some embodiments, a spawn threshold is a condition to end or limit to the number of explorations from spawn point 320. The spawn threshold can be based on a number of configurations or parameters corresponding to virtual interactive environment 300, player character 310, and a curiosity agent service, among other things. For example, a spawn threshold can be configured to be satisfied when the explorations cause a visitation state buffer to include all possible world space positions that can be navigated to by player character 310 from spawn point 320, under a distance threshold and an exploration threshold. As such, once a curiosity agent has explored all possible areas from spawn point 320, under one or more configured conditions, a spawn threshold corresponding to spawn point 320 can be satisfied.

In some embodiments, spawn point 320 can include or have one or more spawn thresholds. In some embodiments, spawn point 320 changes location when a spawn threshold is met. In some embodiments, when a spawn threshold is met, spawn point 320 is set to a location that has not been explored to by player character 310 (e.g., not captured within a visitation state buffer).

As such, a subsequent placement of spawn point 320 can be based in part on previous explorations, or data thereof, by one or more curiosity agents to maximize the coverage of the virtual interactive environment, such that a curiosity agent will be able to direct player character 310 to explore new or novel world space positions. In turn, spawn point 320 can be utilized in the course of exploring a virtual interactive environment in its entirety.

In some embodiments, one or more curiosity agents deployed among a virtual interactive environment 300 can utilize a single spawn point 320. In some embodiments, multiple spawn points 320 can be configured among virtual interactive environments 300 for one or more curiosity agents to utilize. In the utilization of multiple spawn points 320, a spawn threshold can cause one or more spawn points to become active or inactive for spawning player characters for explorations.

Data Visualization and Analysis

Through the use or leveraging of a virtual interactive environment, curiosity agent service, curiosity agents, buffers, and spawn points, data that is representative or indicative of how a user may interact with in the virtual interactive environment can be gathered. Providing visualizations of the data gathered is beneficial—e.g., to learn or understand from and/or derive actionable data. An analysis of the data that identifies one or more aspects indicative of how one or more user interactions correspond or relate to one another is also key for validating one or more aspects of the user experience.

Figure 4:
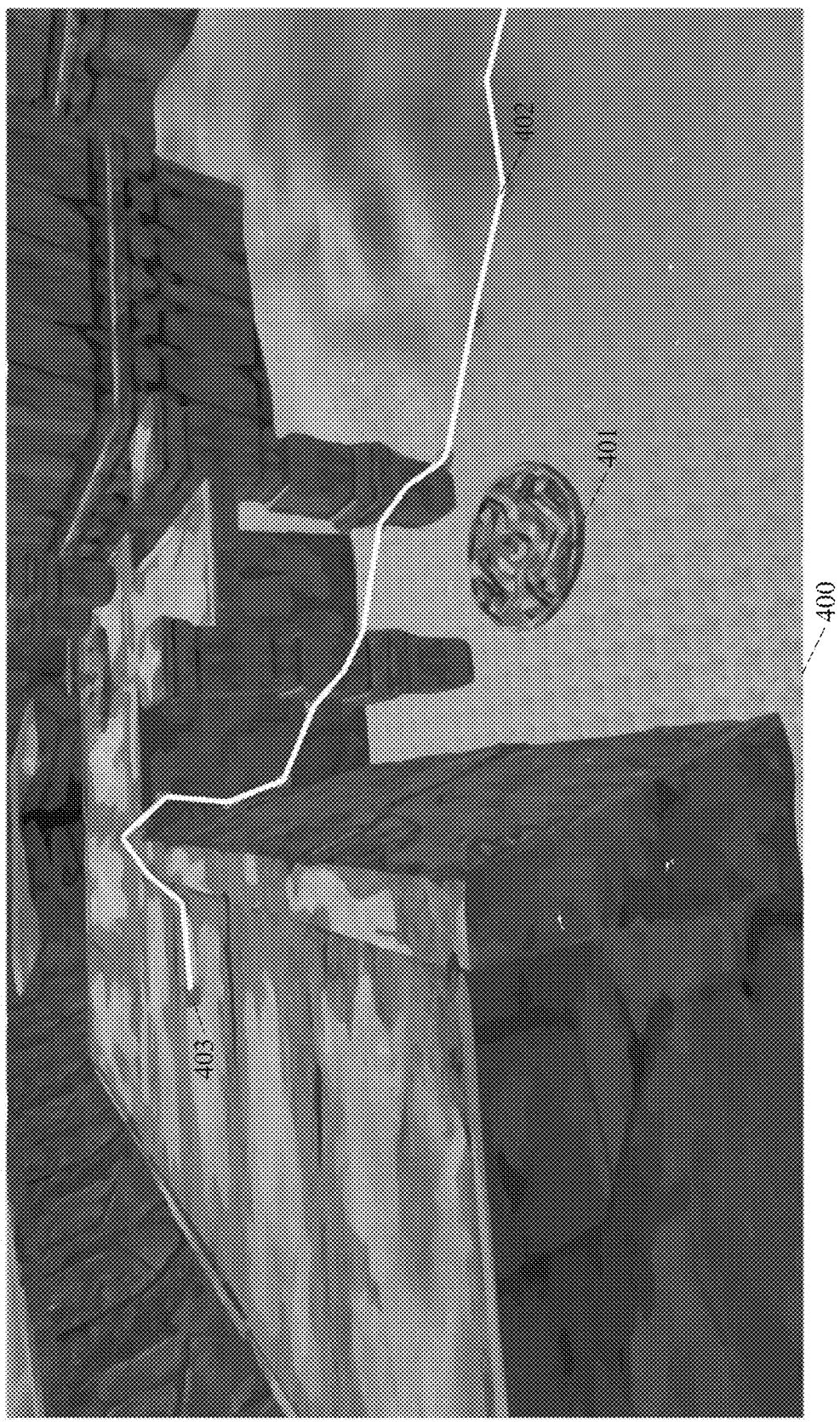
FIG. 4 illustrates an example embodiment of an alternative route discovered by the exploration of a curiosity agent.

FIG. 4 illustrates an example embodiment of an alternative route 402 discovered by an exploration performed by a curiosity agent.

A curiosity agent can be configured to explore a virtual interactive environment 400 without a navigational mesh that guides or directs it. As such, a curiosity agent can explore virtual interactive environment 400 similar to how a user (e.g., user-controlled player character) would. For example, the curiosity agent can perform such an exploration by taking a particular path, out of or motivated by curiosity for the sake of exploring a new or less-than-optimally explored area (e.g., in order to receive the reward for novel exploration) rather than taking an optimal or efficient path or route.

In some embodiments, a curiosity agent may be tasked with or inclined to reach a world space position 403 (illustrated in virtual interactive environment 400 as being an elevated area). Without a navigational mesh, the curiosity agent can explore virtual interactive environment 400 to determine the number of ways to reach world space position 403.

Elevator 401 is incorporated into virtual interactive environment 400 to enable a curiosity agent to reach world space position 403, which a curiosity agent may utilize in one of its explorations. However, since a curiosity agent is configured to explore the virtual interactive environment in novel ways, the curiosity agent can also attempt to reach world space position 403 without utilizing elevator 401.

In some explorations, a curiosity agent may not be able to reach world space position 403. In such cases, data corresponding to the world space positions that the curiosity agent visited can be stored to a visitation state buffer to inform a curiosity agent service about the route taken, which in turn can be utilized to inform the curiosity agent in a subsequent exploration.

Route 402 illustrates a route in which a curiosity agent was able to reach world space position 403 without utilizing elevator 401. In route 402, the curiosity agent was able to utilize or exploit a number of misaligned or misconfigured boundaries of virtual interactive environment 400 along the size of the pillars and wall edges to traverse up to the elevated area where world space position 403 is located.

As such, data corresponding to the curiosity agent's exploration of virtual interactive environment 400 can show a number of things, including the number of ways world space position 403 was reached. However, not all of the data corresponding to the curiosity agent's exploration of virtual interactive environment 400 may be useful for each type of insight or indication sought. As such, it may be that only a portion of the data corresponding to the curiosity agent's exploration of virtual interactive environment 400 is to be analyzed or visualized.

In turn, the utilization of buffers—such as buffers 222, 224, and 226 of FIG. 2—enable the appropriate data sought to be readily identifiable and accessible. Additionally, the manner in which explorations occur from a spawn point, such as spawn point 320, can also be utilized since they correspond to a particular explorable area or region of a virtual interactive environment.

In the instance of identifying the manners in which world space position 403 (e.g., an area of interest) was reached by a curiosity agent, a data analysis could be narrowed to explorations from a spawn point location that resulted or included a visitation to world space position 403. Thereafter, the analysis could be further configured to exclude explorations in which a curiosity agent utilized one or more anticipated routes or elements, such as elevator 401, which in turn would result in determination and visualization of route 402.

Figure 5:
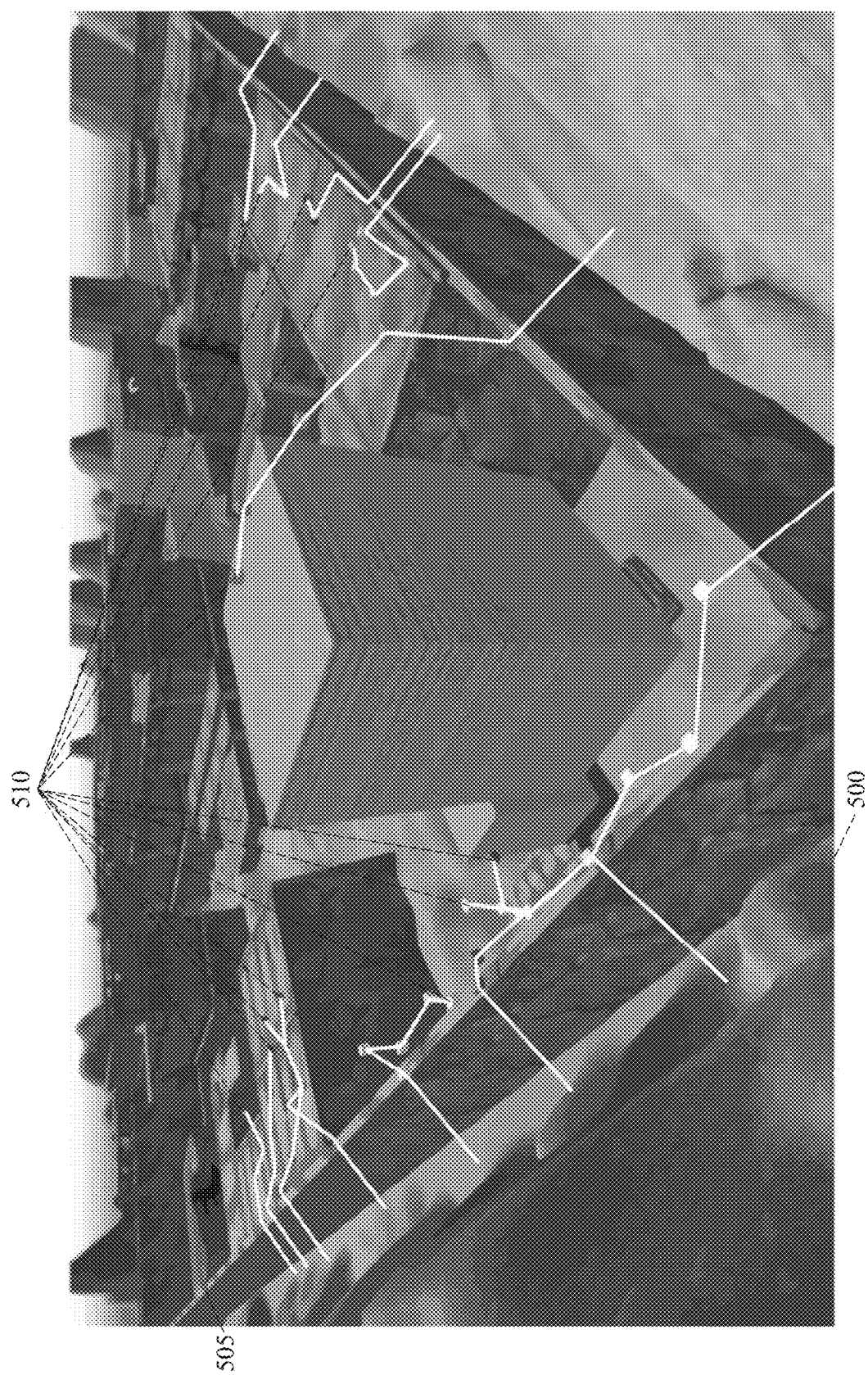
FIG. 5 illustrates an example embodiment of boundary exploits discovered by the exploration of a curiosity agent.

FIG. 5 illustrates an example embodiment of boundary exploits discovered by the exploration of a curiosity agent.

Virtual interactive environment 500 includes a bounding wall 505 that acts as a barrier between the playable area and non-playable area. A curiosity agent can be configured to explore virtual interactive environment 500 without a navigational mesh that guides or directs it. As such, a curiosity agent can explore beyond bounding wall 505 since it is otherwise unaware of the boundary the bounding wall 505 represents.

As such, one or more curiosity agents may explore beyond bounding wall 505 in a number of ways. In some cases, the ability to exceed the bounding wall 505 is an exploit to virtual interactive environment 500 that should be remedied. Therefore, it would be important to gather data corresponding to the ways in which a curiosity agent exceeded bounding wall 505.

Data corresponding to the explorations or routes resulting in a curiosity agent exceeding the bounding wall 505 can be readily identified and obtained in a number of ways. For example, a visitation state buffer, episodic trajectory buffer, and termination buffer can be referenced and utilized in making the determination. Thereafter, the corresponding routes or explorations can be visualized in the virtual interactive environment if desired.

Routes 510 illustrate the ways in which a curiosity agent exceeded bounding wall 505. Routes 510 can provide an insight as to how the exploit may be remedied.

Figure 6:
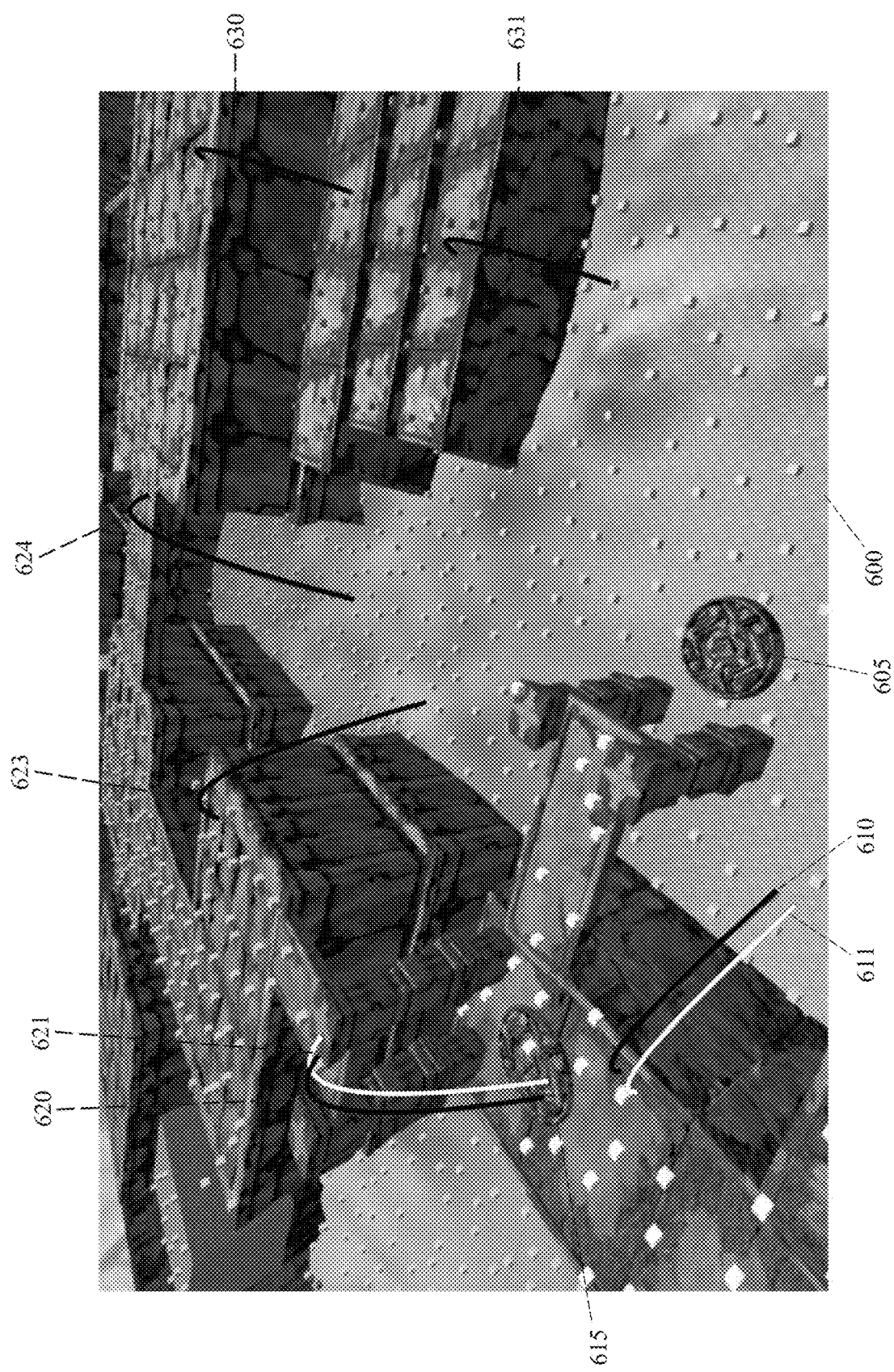
FIG. 6 illustrates an example embodiment of a connectivity graph visualization based in part on the data collected from the exploration of curiosity agent.

FIG. 6 illustrates an example embodiment of a connectivity graph visualization based in part on the data collected from the exploration of curiosity agent. A connectivity graph illustrates the interactive relationship between regions or other identifiable or quantifiable areas in a virtual interactive environment. The interactive relationship between regions corresponds to the manner in which a curiosity agent explored or navigated between two or more areas of a virtual interactive environment.

Virtual interactive environment 600 includes a visualization of visitation state data captured within a visitation state buffer, similar to visitation state buffer 222 of FIG. 2. The visualization of visitation state data is rendered, in one example, as three-dimensional cubes through virtual interactive environment 600, where each region of the virtual interactive environment applies a different color or shade to the respective cubes for identifying each cube as corresponding to a particular region. Though, it should be understood that such visualizations can be of any style or details as would be deemed useful by one of skill in the art.

The system and process for the generation of a connectivity graph can also leverage data captured with an episodic trajectory buffer, similar to episodic trajectory buffer 224 of FIG. 2, to identify routes and/or paths taken by one or more curiosity agents deployed among virtual interactive environment 600. In conjunction with the visitation state data, episodic trajectory data can be utilized to make a determination of the interactive relationship between regions. In some embodiments, there are one or more interactive relationships illustrated among the virtual interactive environment when displaying or rendering a connectivity graph among a virtual interactive environment.

The connectivity graph can be illustrated, for example, by a number of rendered arches (e.g., 610, 611, 620, 621, 623, 624, 630, and 631). The rendered arches represent the way or manner in which a curiosity agent interacted, navigated through, or traversed between regions of virtual interactive environment 600.

In some embodiments, the rendered arches are color coded to indicate a manner or directionality in which a curiosity agent traversed between regions. For example, the white arches (e.g., 611 and 621) can indicate that a curiosity navigated up from one region to another while the black arches (e.g., 610,620,623,624,630, and 631) can indicate that a curiosity agent navigated downward from one region to another.

The interactive relationships illustrated in the connectivity graph provide an insight as to how a user can or must navigate between regions of virtual interactive environment 600. For example, there are a number of ways for the user to traverse downward from an elevated region to a lower region (e.g., as illustrated by arches 610,620,623,624,630, and 631). However, there are only a limited number of ways for how a user can traverse upward to a more elevated region (e.g., arches 611 and 621). Additionally, the manner in which the user traverses between regions can also be readily identified, such as by the placement of the arches. For example, for a user to traverse upwards between regions as illustrated by arch 611, a user may be required to take the elevator platform 605 to reach the upper region.

In some embodiments, the placement of arches of a connectivity graph among virtual interactive environments 600 can correspond to the routes or paths taken by a curiosity agent during deployment. For instance, arches 620 and 621 are illustrated directly above elevator platform 615 which can correspond to curiosity agents utilizing elevator platform 615 repeatedly when traversing upward and downward between the respective regions. However, arches 610 and 611 are illustrated (or rendered or displayed) further from platform 605, which may indicate there is an alternative route or exploit that one or more curiosity agents exploring virtual interactive environment 600 took during an exploration.

A connectivity graph can illustrate various aspects of interaction between regions of a virtual interactive environment, which can be utilized to validate one or more aspects of a virtual interactive environment or utilized to gain insight as to alternative interactions that were incidentally or accidentally incorporated. As a result, a connectivity graph based in part on the data of the exploration of curiosity agents is helpful to validation of aspects relating to user experience of and/or in a video game.

Overall, the amount of data that gets aggregated from automated agents can be vast and difficult to analyze in a meaningful way. The examples provided in FIGS. 4, 5, and 6 illustrate an approach that provides a benefit over traditional systems (e.g., heat maps) since data buffers can be leveraged and analyzed in a way that provides meaningful and insight visualization of explorations.

One skilled in the art would appreciate the example visualizations provided in FIGS. 4, 5, and 6 could be implemented, configured, and displayed among virtual interactive environments in a number of ways. As such, the visualizations in FIGS. 4, 5, and 6 are provided by way of example, and not limitation. Data acquired from curiosity agents can be displayed or visualized in a number of ways. However, FIGS. 4, 5, and 6 highlight the importance of presenting the data in a way that is meaningful or insightful with respect to validating various aspects of a video game.

The examples in FIGS. 4, 5, and 6 also demonstrate the variety of novel explorations the curiosity agents are able to perform based in part on "curiosity" being the rewarding factor, thereby better representing the gameplay of a potential or actual user of a video game. As such, the visualizations that can be generated and displayed based in part on the explorations of curiosity agents are more useful to testing and validating aspects of a video game since the curiosity agents are playing the game in a manner similar to a real human user, which provides a benefit over traditional techniques that use automated agents or visualizations based off of automated agents that are configured with navigation meshes or configured to complete, test, or validate particular aspects of a video game.

Process

Figure 7:
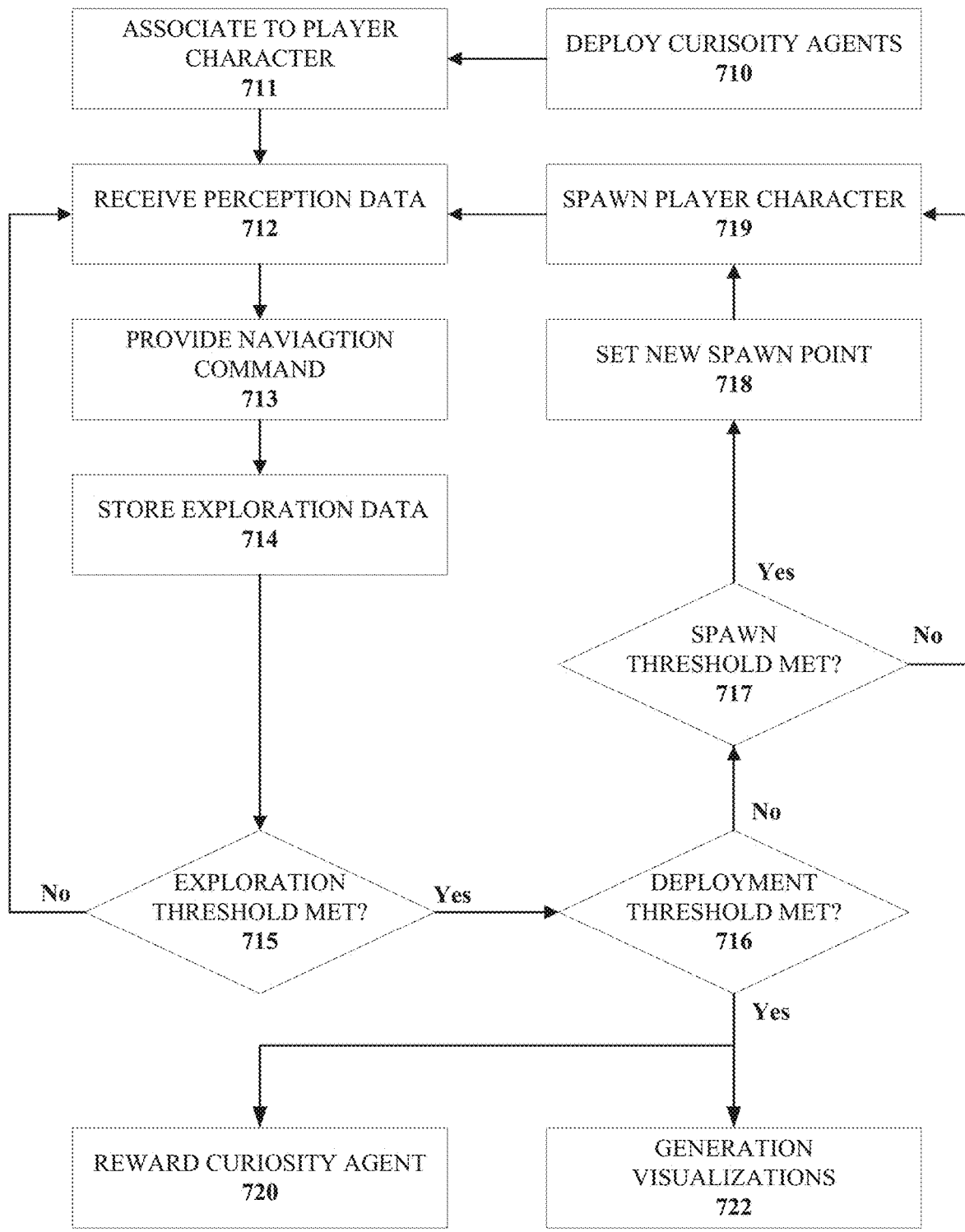
FIG. 7 illustrates an example embodiment of an exploration process associated with the curiosity agent.

FIG. 7 illustrates an example embodiment of an exploration process associated with the curiosity agent. In some embodiments, process 700 represents the steps occurring during the deployment of curiosity agents from curiosity agent service in a video game: similar to those illustrated in and described herein with reference to FIG. 1B and FIG. 2.

At step 710, a curiosity agent service deploys one or more curiosity agents into one or more visual interactive environments of one or more game clients (e.g., instances of virtual interactive environments). In some embodiments, the instances of virtual interactive environments where curiosity agents are deployed can differ and/or vary among one another. In some embodiments, the curiosity model in which a curiosity agent is based in part on can differ and/or vary among curiosity agents.

At step 711, the curiosity agent service can be associated to or with one or more player characters. The association of the curiosity agent to or with a player character can occur as a step before, after, and/or simultaneously with (in whole or in part) the deployment of the curiosity agent of step 710. In some embodiments, a player character is configured to be spawned at a spawn point in a virtual interactive environment, such as spawn point 320 of FIG. 3, upon association or deployment of a curiosity agent at steps 710 or 711. In some embodiments, one or more player characters are spawned at a spawn point prior to the deployment and/or association of a curiosity agent.

At step 712, the curiosity agent service can receive perception data, similar to perception data 215(A) of FIG. 2. The perception data received at step 712 can provide the curiosity agent service information about the virtual interactive environment that a curiosity agent is associated with and/or deployed in.

At step 713, the curiosity agent service can provide one or more navigation commands to one or more curiosity agents. In some embodiments, the navigation commands provided at step 713 are similar to navigation command 215(B) described with reference to FIG. 2. The navigation command provided at step 713 can be based in part on the perception data of step 712.

At step 714, data corresponding to the exploration of the curiosity agent is stored. The data can be stored before, after, and/or while a player character associated with a curiosity agent completes or performs a navigation command, as provided in step 713. In some embodiments, the exploration data stored in step 714 is stored into buffers similar to buffers 222, 224, and/or 226 of FIG. 2.

At step 715, the curiosity agent service can determine or check whether an exploration threshold is met, thereby signaling or indicating the completion of an exploration by a curiosity agent. An exploration and exploration threshold can be similar to those described above with reference to FIG. 2. When the exploration threshold is not met at step 715, the curiosity agent service can cause, enable, or allow a curiosity agent to continue exploring a virtual interactive environment and reiterate through steps 712, 713, and 714. When the exploration threshold is met at step 715, the curiosity agent service can identify or otherwise label or indicate that an exploration is complete.

Upon completion of an exploration, the curiosity agent service can determine or check whether a deployment threshold is met at step 716. A deployment threshold can include one or more conditions or criteria that, when met or satisfied, indicate or signify the completion of a deployment of one or more curiosity agents. For example, a deployment threshold can be configured to be: when one or more curiosity agents have explored some minimum (e.g., determined or pre-determined) limit of the explorable area of a virtual interactive environment. As another example, a deployment threshold can be configured as being a finite number of explorations. It should be understood that a deployment threshold can be configured in a number of ways including to correspond to aspects relating to the explorations of a curiosity agent or aspects relating to gameplay and objectives in a virtual interactive environment, among other things.

The deployment threshold indicates the completion of a deployment of one or more curiosity agents. When a determination of the deployment threshold is met, the curiosity agent service can proceed to reward the curiosity agent, or the respective curiosity agent model, at step 720. Additionally, the data obtained over the course of a deployment and explorations, such as in step 714, can be utilized to generate visualizations, such as those illustrated in FIGS. 4, 5, and 6. In some embodiments, the visualizations of step 722 can be generated and displayed "offline" by a game client (e.g., after the deployment of curiosity agents). In some embodiments, the visualizations of step 722 can be generated and displayed "online" in real-time (or near real-time) by a game client (e.g., during the deployment of curiosity agents).

If a deployment threshold is not met at step 716, the curiosity agent service can proceed with a subsequent exploration for or by a curiosity agent. When proceeding with a subsequent exploration, the curiosity agent service can determine or check whether a spawn threshold is met at step 717. The spawn threshold can be similar to the one described herein with reference to FIG. 3 for spawn point 320. When the spawn threshold is not met, the curiosity agent service can begin a subsequent exploration by spawning the player character at the same or previous spawn point at step 719. When the spawn threshold is met, the curiosity agent service can proceed to step 718 to set a new spawn point in the virtual interactive environment.

At step 718, the curiosity agent service can determine an appropriate location to set a subsequent spawn point. As described in FIG. 3, the subsequent spawn point can be of a location or world space position among the virtual interactive environment that maximizes the coverage or amount of coverage a curiosity agent can have in a subsequent exploration. Thereafter, the player character associated with a curiosity agent can be spawned at the subsequent spawn location in step 719 and proceed with a subsequent exploration.

The steps illustrated in process 700 are provided by way of example, and not limitation, and can be implemented in a number of ways by one skilled in the art. As such, the steps of process 700 can occur in different orders and/or simultaneously with one another.

The process 700 demonstrates one of a number of ways for a curiosity agent service and curiosity agents to explore a virtual interactive environment. In some embodiments, data corresponding to each exploration can also be captured and stored, such as on a data store or buffer. In some embodiments, explorations can be grouped or categorized based on a number of factors, including the spawn point used.

Computing Device

Figure 8:
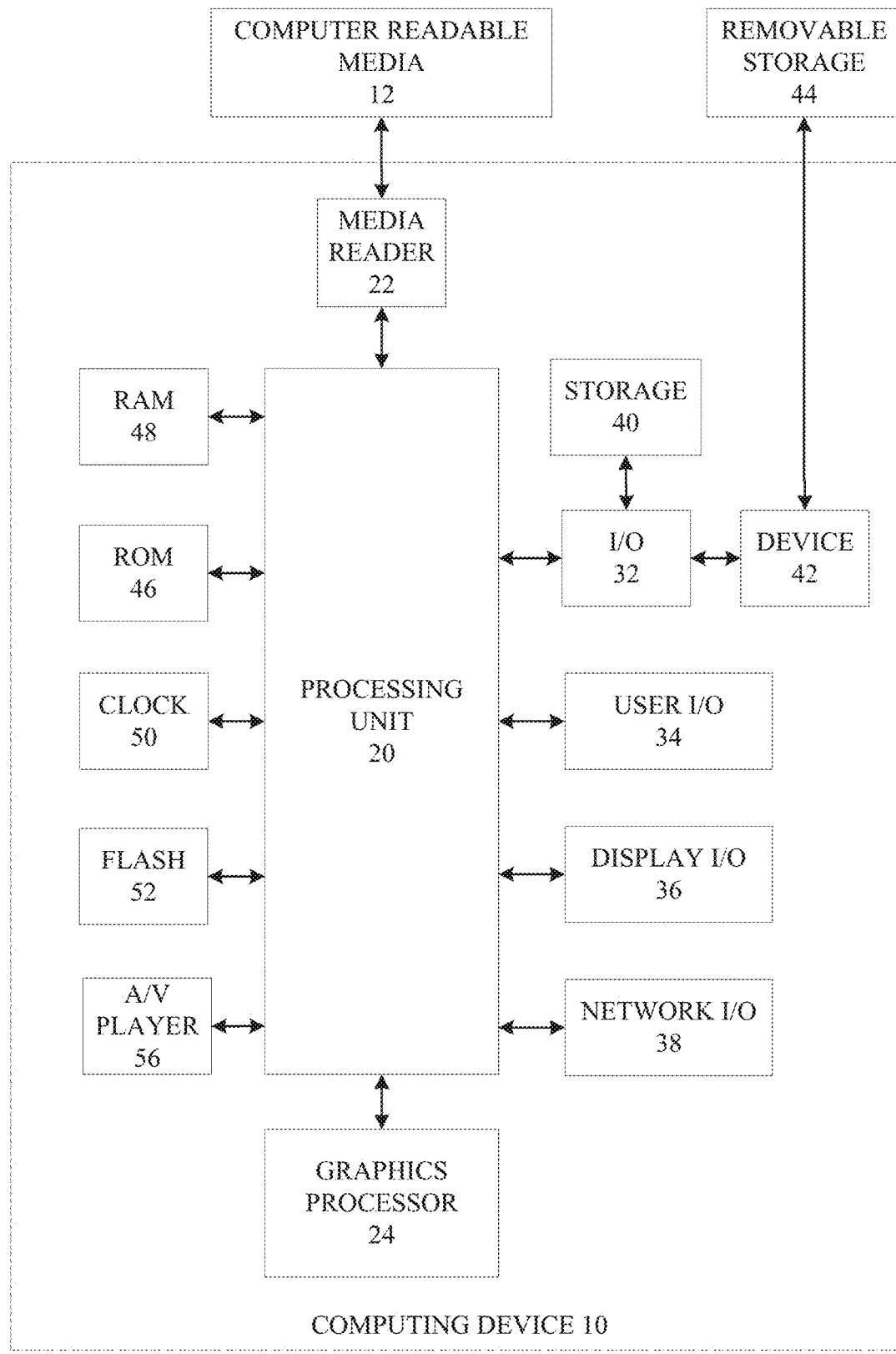
FIG. 8 illustrates an example embodiment of a computing device.

FIG. 8 illustrates an example embodiment of the resources within a computing device 10. In some embodiments, some or all of the computing devices 110 and server device 130 of FIG. 1 are similar to computing device 10, as known to those of skill in the art.

Other variations of the computing device 10 may be substituted for the examples explicitly presented herein, such as removing or adding components to the computing device 10. The computing device 10 may include a video game console, a smart phone, a tablet, a personal computer, a laptop, a smart television, a server, and the like.

As shown, the computing device 10 includes a processing unit 20 that interacts with other components of the computing device 10 and external components. A media reader 22 is included that communicates with computer readable media 12. The media reader 22 may be an optical disc reader capable of reading optical discs, such as DVDs or BDs, or any other type of reader that can receive and read data from computer readable media 12. One or more of the computing devices may be used to implement one or more of the systems disclosed herein.

Computing device 10 may include a graphics processor 24. In some embodiments, the graphics processor 24 is integrated into the processing unit 20, such that the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a video game console device, a general-purpose laptop or desktop computer, a smart phone, a tablet, a server, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently during execution of software.

User I/O 34 is used to send and receive commands between processing unit 20 and user devices, such as keyboards or game controllers. In some embodiments, the user I/O can include a touchscreen. The touchscreen can be a capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, GUIs, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

Some portions of the detailed descriptions above are presented in terms of symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The disclosed subject matter also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The disclosed subject matter may be provided as a computer program product, or software, that may include a machine-readable medium having stored thereon instructions, which may be used to program a computer system (or other electronic devices) to perform a process according to the disclosed subject matter. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Certain example embodiments are described above to provide an overall understanding of the principles of the structure, function, manufacture and use of the devices, systems, and methods described herein. One or more examples of these embodiments are illustrated in the accompanying drawings. Those skilled in the art will understand that the descriptions herein and the accompanying drawings are intended to be illustrative, and not restrictive. Many other implementations will be apparent to those of skill in the art based upon the above description. Such modifications and variations are intended to be included within the scope of the present disclosure. The scope of the present disclosure should, therefore, be considered with reference to the claims, along with the full scope of equivalents to which such claims are entitled. The features illustrated or described in connection with one exemplary embodiment may be combined with the features of other embodiments. In some instances, well-known structures and devices are shown in block diagram form, rather than in detail, in order to avoid obscuring the disclosed subject matter.

What is claimed is:

1. A computing system comprising:
   one or more processors; and
   one or more memory devices, each of the one or more memory devices communicatively coupled to at least one of the one or more processors, the one or more memory devices storing computer-executable instructions that when executed cause the one or more processors to:
   deploy a curiosity agent for a first instance of a first virtual interactive environment of a video game;
   associate the curiosity agent to a player character of the video game;
   cause the curiosity agent to direct the player character to navigate the first virtual interactive environment from a first spawn point, over a plurality of explorations until a navigation threshold is reached, by:
     (i) receiving, from the curiosity agent, perception data corresponding to one or more of the plurality of explorations performed by the player character, and
     (ii) providing, to the curiosity agent, one or more navigation commands to cause the curiosity agent to direct the player character, wherein the one or more navigation commands are based at least in part on the perception data and a visitation state buffer;
   store, within the visitation state buffer, a new data entry corresponding to a new location visited by the player character, wherein the new data entry corresponds to a location of an existing data entry of the visitation state buffer that is beyond a distance threshold;
   update, within the visitation state buffer, counters associated with each of the existing data entries when the curiosity agent directs a player character to visit a location within the distance threshold of the respective existing data entry;
   provide, to the curiosity agent, a reward based in part on the visitation state buffer; and
   determine if a spawn threshold is met, wherein meeting the spawn threshold causes a curiosity agent service to:
     (i) determine a location for a subsequent spawn point in the first instance of the first virtual interactive environment, and
     (ii) set the subsequent spawn point in the determined location for a subsequent exploration among the plurality of explorations.

2. The computing system of claim 1, wherein each exploration among the plurality of explorations is complete when at least one of the following criteria is met:
   (i) a termination counter is incremented,
   (ii) the last iteration of an exploration is completed, wherein the last iteration corresponds to the navigation threshold, or
   (iii) the spawn threshold is reached.

3. The computing system of claim 2, wherein the deployment of the curiosity agent is complete upon completion of the plurality of explorations.

4. The computing system of claim 3, wherein the curiosity agent can direct the player character without a navigation mesh.

5. The computing system of claim 4, wherein the navigation threshold corresponds to at least one of the following:
   (i) a distance in the first virtual interactive environment, or
   (ii) an amount of navigation commands to provide the curiosity agent.

6. The computing system of claim 5, wherein perception data includes at least one of the following:
   (i) one or more ray casts associated with the player character, and
   (ii) one or more images associated with a perspective corresponding to the player character.

7. The computing system of claim 6, wherein the reward provided to the curiosity agent correlates with values of the counters associated with each data entry in the visitation state buffer.

8. The computing system of claim 7, wherein the spawn threshold is based at least in part on the visitation state buffer.

9. The computing system of claim 8, wherein a node graph is generated based in part on the deployment of the curiosity agent, the node graph depicting at least:
   (i) a connectivity graph depicting interactive relationships between regions of the first virtual interactive environment,
   (ii) inaccessible regions among regions of the first virtual interactive environment, and
   (iii) exploits among the first virtual interactive environment.

10. The computing system of claim 9, wherein the node graph can be displayed within an instance of the first virtual interactive environment.

11. A computer implemented method of a curiosity agent service and a virtual interactive environment comprising:
   deploying, from the curiosity agent service, a curiosity agent to associate to a player character in a first instance of a first virtual interactive environment of a video game;
   associating the curiosity agent to the player character;
   causing, by the curiosity agent service, the curiosity agent to direct the player character to navigate the first virtual interactive environment from a first spawn point, over a plurality of explorations, by iteratively, up to a navigation threshold:
      (i) receiving, from the curiosity agent, perception data corresponding the player character, and
      (ii) providing, to the curiosity agent, one or more navigation commands to cause the curiosity agent to direct the player character, wherein the one or more navigation commands are based at least in part on the perception data and a visitation state buffer;
   storing, within the visitation state buffer, a new data entry corresponding to a new location visited by the player character, wherein the visitation state buffer is configured to require the new data entry to be at a location beyond a distance threshold of any existing data entry of the visitation state buffer;
   updating, within the visitation state buffer, counters associated with each data entry when the curiosity agent directs a player character visits a location within the distance threshold of a respective data entry;
   providing, by the curiosity agent service, a reward based in part on the visitation state buffer; and
   determining, by the curiosity agent service, if a spawn threshold is met, wherein meeting the spawn threshold causes the curiosity agent service to:
      (i) determine a location for a subsequent spawn point in the first instance of the first virtual interactive environment, and
      (ii) set the subsequent spawn point in the determined location for a subsequent exploration among the plurality of explorations.

12. The computer implemented method of claim 11, wherein each exploration among the plurality of explorations is complete upon at least:
   (i) incrementing a termination counter,
   (ii) completing the last iteration of an exploration, wherein the last iteration corresponds to the navigation threshold, or
   (iii) meeting a spawn threshold.

13. The computer implemented method of claim 12, wherein the deployment of the curiosity agent is complete upon completion of the plurality of explorations.

14. The computer implemented method of claim 13, wherein the navigation threshold corresponds to at least one of the following:
   (i) a distance in the virtual interactive environment, or
   (ii) an amount of navigation commands to provide the curiosity agent.

15. The computer implemented method of claim 14, wherein perception data includes at least one of the following:
   (i) one or more ray casts associated with the player character, and
   (ii) one or more images associated with a perspective corresponding to the player character.

16. The computer implemented method of claim 15, wherein the reward provided to the curiosity agent correlates with values of the counters associated with each data entry in the visitation state buffer.

17. The computer implemented method of claim 16, wherein the spawn threshold is based at least in part on the visitation state buffer.

18. The computer implemented method of claim 17, wherein a node graph is generated based in part on the deployment of the curiosity agent, the node graph depicting at least:
   (i) a connectivity graph depicting interactive relationships between regions of the first virtual interactive environment,
   (ii) inaccessible regions among regions of the first virtual interactive environment, and
   (iii) exploits among the first virtual interactive environment.

19. The computer implemented method of claim 18, wherein the node graph can be displayed within an instance of the first virtual interactive environment.

20. A computer readable medium storing computer-executable instructions defining at least a curiosity agent service and a video game, execution of the computer-executable instructions comprising:
   deploying, from the curiosity agent service, a curiosity agent to associate to a player character in a first instance of a first virtual interactive environment of the video game;

associating the curiosity agent to the player character;
causing, by the curiosity agent service, the curiosity agent to direct the player character to navigate the first virtual interactive environment from a first spawn point, over a plurality of explorations, by iteratively, up to a navigation threshold:
  (i) receiving, from the curiosity agent, perception data corresponding the player character, and
  (ii) providing, to the curiosity agent, one or more navigation commands to cause the curiosity agent to direct the player character, wherein the one or more navigation commands are based at least in part on the perception data and a visitation state buffer;
storing, within the visitation state buffer, a new data entry corresponding to a new location visited by the player character, wherein the visitation state buffer is configured to require the new data entry to be at a location beyond a distance threshold of any existing data entry of the visitation state buffer;
updating, within the visitation state buffer, counters associated with each data entry when the curiosity agent directs a player character visits a location within the distance threshold of a respective data entry;
providing, by the curiosity agent service, a reward based in part on the visitation state buffer; and
determining, by the curiosity agent service, if a spawn threshold is met, wherein meeting the spawn threshold causes the curiosity agent service to:
  (i) determine a location for a subsequent spawn point in the first instance of the first virtual interactive environment, and
  (ii) set the subsequent spawn point in the determined location for a subsequent exploration among the plurality of explorations.

* * * * *